United States Patent [19]

Medan

[11] Patent Number: 4,941,152
[45] Date of Patent: Jul. 10, 1990

[54] SIGNAL CODING PROCESS AND SYSTEM FOR IMPLEMENTING SAID PROCESS

[75] Inventor: Yoav Medan, Haifa, Israel

[73] Assignee: International Business Machines Corp., Armonk, N.Y.

[21] Appl. No.: 899,261

[22] Filed: Aug. 22, 1986

[30] Foreign Application Priority Data

Sep. 3, 1985 [IL] Israel ........................ 76283

[51] Int. Cl.⁵ ............................................. H04B 14/06
[52] U.S. Cl. ...................................... 375/27; 375/122; 381/31
[58] Field of Search ........................ 375/25, 27, 30, 33, 375/122; 381/29, 3 D, 31; 341/51, 60, 61, 76

[56] References Cited

U.S. PATENT DOCUMENTS

| 4,142,071 | 2/1979 | Croisier et al. | 381/29 |
| 4,216,354 | 8/1980 | Esteban et al. | 381/29 |
| 4,455,649 | 6/1984 | Esteban et al. | 381/31 |
| 4,535,472 | 8/1985 | Tomcik | 381/31 |
| 4,622,680 | 11/1986 | Zinser | 381/31 |
| 4,713,776 | 12/1987 | Araseki | 381/31 |

Primary Examiner—Benedict V. Safourek
Attorney, Agent, or Firm—John B. Frisone

[57] ABSTRACT

A signal coding process more particularly suitable for coding a voice signal. At least a portion of the frequency bandwidth of said voice signal is split into several subbands, the content of which is then requantized using a dynamic allocation of requantizing levels throughout the subbands. The process is also made to provide optimal level allocations. The requantized signal samples throughout the subbands are packed into a binary word.

13 Claims, 2 Drawing Sheets

SIGNAL CODING PROCESS AND SYSTEM FOR IMPLEMENTING SAID PROCESS

TECHNICAL FIELD

This invention relates to digital techniques for coding a time-sampled signal and improving the quantizing signal-to-noise ratio. It applies more particularly to voice signals.

TECHNICAL BACKGROUND

The translation of a time-varying signal into digital code is performed by sampling said signal and by quantizing the samples. This involves the preliminary partitioning into sections of the continuous scale used to measure the signal amplitudes, and the assignment of a single digital value to each of said sections. When the signal quantizing operation is carried out, all the samples, the amplitude of which lay within the limits of a given section, i.e. said amplitude is between two consecutive partitioning levels, are coded with the same digital value. Of course this results in a transcription involving an error between the original signal and its coded form. The coding operation is said to generate a quantizing noise.

It is obvious that narrowing the sections, by setting the quantizing levels closer to each other, will result in a reduction of the noise. However, for given limits of amplitude variations, this operation would increase the number of sections and therefore the number of digital values used for coding them, and consequently the number of bits required to digitally define the sections. This results in a higher complexity of the devices to be provided for processing the signal expressed in digital form, and also would require a higher bit rate for transmitting the digitally encoded signal. Therefore it is desirable to reduce as much as possible the number of bits used in the coding operation, while keeping the signal-to-noise ratio at an acceptable level. Or, conversely, the overall bit resources allocated to the quantizing operations being fixed, they should be used as efficiently as possible.

Several processes have been provided to reach that target, among which we will consider, here, essentially the processes in which the frequency bandwidth of the signal to be digitally encoded is split into several subbands and then the subband signals are encoded using a dynamic allocation of the coding resources based on the relative energies of the sub-band signals. The splitting operation could be performed either on the overall frequency bandwidth of the signal as disclosed in French Patent No. 2389277, or on a limited portion of said bandwidth as disclosed in European patent No. 0002998. In both patents the signal within at least a portion of the speech signal bandwidth is split into N frequency subbands using a bank of filters. Each subband contents is then separately coded with a number of bits relative to the subband energy. This kind of coding allows a distribution of the bit resources to different frequency bands, so that most of these bit resources are allocated to high energy bands, and the minority of them to less energetic bands. The coded values of speech in the different bands are finally packed using a more or less complex packing format.

At the other end of the packing process, the packing needs to be reversed to yield the reconstructed signal. In the above referenced systems the number $b(i)$ of bits dynamically allocated to the i-th subband at a given instant is related to the total number of bits B available to all the subbands per one signal sample and to the subband contained energy. This number of bits may be a non integer number. It has to be adjusted by rounding the non-integer optimal allocation using an approximation method. An improvement to this method is proposed here wherein quantizing levels rather than numbers of bits are dynamically allocated to the subband signals. A method to extract an optimal rather than an approximate integer level allocation from the non-integer optimal allocation is given as well.

OBJECTS OF THE INVENTION

One object of this invention is to provide a digital process for coding a signal in which at least a portion of the signal frequency bandwidth is split into several subbands and then the signals within the subbands are requantized in either a uniform or a non-uniform quantizer, using dynamic allocation of the individual quantizing levels to the respective subbands with the level allocation being based on the relative energies within the subbands.

DESCRIPTION OF A PREFERRED EMBODIMENT

Figure 1:
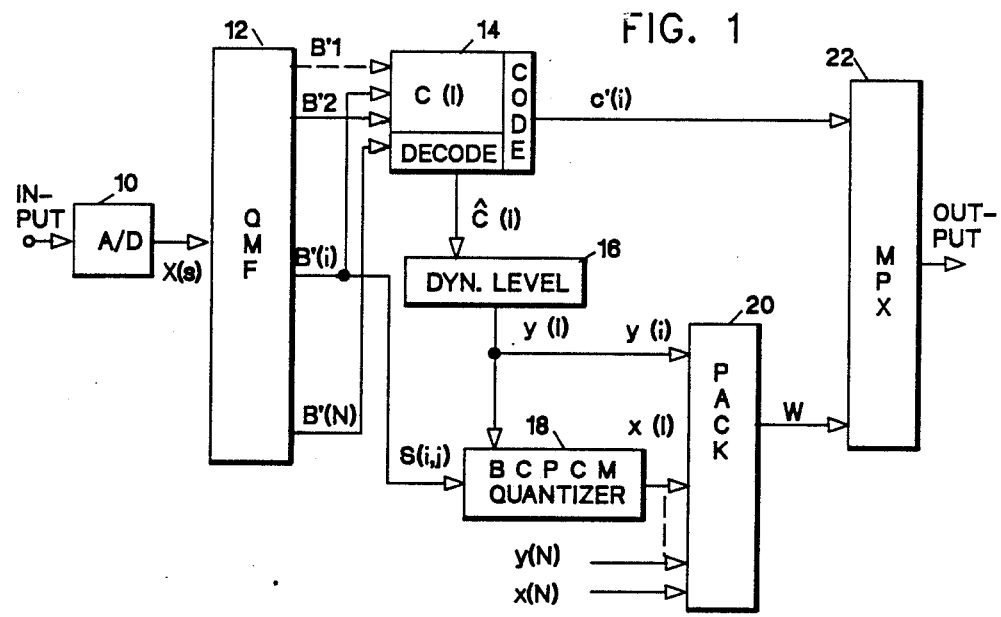
FIG. 1 is a block diagram of a coder incorporating the invention.

Subband coding (SBC) associated with Block Companded PCM (BCPCM) techniques have been shown to be an efficient approach to digitally coding voice signals. BCPCM could be summarized as follows: the signal to be coded is considered by successive fixed length portions. Assuming a PCM pre-encoding operation has been performed to enable further processing of the signal to be digital, then each portion of signal is represented by a block of samples. The conversion into BCPCM leads then to the determination of a scale factor (or characteristic term) c for each block and then each block of samples is recoded relatively to said characteristic term c. For further details on BCPCM techniques one may refer to an article by A. Croisier et al relating to a lecture given at the 1974 International Seminar on Digital Communication, in Zurich (Switzerland) and entitled "Progress in PCM and Delta Modulation: Block Companded Coding of Speech Signal".

When applied in conjunction with split band techniques, each unsplit block generates simultaneously a different block in each subband. Then, the various subband blocks are requantized to get a more efficient use of the coding resources. One way of doing the requantizing has already been described in the patents mentioned above. In these patents the quantizing bits available are dynamically assigned to the various subbands based on their energy contents. In other words the optimal allocation of bits to the different bands is proportional to the spectral amplitude within each subband, to minimize the quantizing noise energy. The optimal allocation is computed for each block. Let's denote by:

b(i) : The optimal bit allocation, i.e. the optimal number of bits assigned to the i-th subband ( $i=1,2,3,\ldots,N$), at the k-th block.

c(i) : The scale factor or the maximum absolute sample of the signal of the considered subband.

E(i) : The energy of the i-th band at the k-th block. It is considered at first order that the energy E(i) is proportional to the square of the scale factor c(i):

$$E(i) = (a.c(i))**2, \quad (1)$$

with ** indicating a power operation, indicating a multiplication, and,

"a" being a constant.

B: The number of bits available to all subbands per one speech sample.

Then the number of bits to be assigned to the i-th subband would be $$b(i) = \frac{B}{N} + \log c(i) - \frac{1}{N} \sum_{j=1}^{N} \log c(j) \quad (2)$$

wherein $\sum_{j=1}^{N}$ represents a summing operation for $j = 1,2,3,\ldots,N.$ Given equation (2), obviously the optimal value of b(i) might be a non integer value. Then the number of bits effectively allocated in practice needs be adjusted to an integer value. Also one may note that the number of quantizing levels q(i) is given by $$q(i) = 2 ** b(i) \quad (3)$$

The number of level is thus related to the number of bits allocated to each subband through equation (3). Thus, the number of candidate allocations of levels is generally higher than the number of candidate allocations of bits or of levels implied by using integer number of bits and more flexibility of the quantizing system may be achieved by allocating dynamically quantizing levels rather than quantizing bits. For instance, B=3 bits for N=2 bands would provide only four possible allocations in the case of integer bit allocation whereas eleven different allocations are possible with the proposed integer level allocation.

This invention may apply to any split band coder. More particularly, the quantizing levels may be dynamically assigned to the full voice bandwidth, or it may be applied to a portion of said bandwidth (e.g. the base band).

Represented in FIG. 1 is a block diagram illustrating the basic operations of this invention as applied to a full voice telephone bandwidth. The speech signal, which may have been band limited to the 300–3400 telephone bandwidth, is first applied to an analog to digital PCM converter (10) which provides a conventional PCM conversion by sampling the signal at 8 kHz and quantizing the samples with 12 bits per sample. The PCM coded samples X(s), are then fed into a bank of filters FB (12) which processes the speech signal. This bank of filters may be made using the Quadrature Mirror Filters (QMF) techniques as disclosed in the IBM Technical Disclosure Bulletin Vol. 19, No. 9, February 1977, pp. 3438-3439. The original bandwidth is split by the bank of filters, into N subbands B'1-B'N, the contents of which are down sampled to keep the overall number of samples throughout the N subbands roughly constant. Each subband signal is then fed into a device (14) which processes blocks of samples each representing a predetermined length (e.g. 32 ms long) segment of subband signal, to derive therefrom the so-called subband characteristic terms c(i). Each characteristic term is code converted with a predetermined number of bits into a c'(i) term. This code conversion is obviously not a must for this invention. However, should it be done, then a decoding into ĉ(i) would be recommended for further processing. The ĉ(i) terms are then used for performing the dynamic level allocation operations in (16). The levels y(i) assigned to the i-th subband are used to control a BCPCM quantizer (18) which converts each sample of the i-th subband into an x(i) value. In BCPCM, the level values may be used for requantizing each sample within the considered block of samples. S(i,j) is used here to designate the j-th sample of said block within the i-th subband. The x(i)'s of the N subbands considered at the same sampling time and the corresponding y(i)'s are then packed in (20) into a macrosample word W. More precisions on all these operations will be given later on. Finally the characteristic terms c'(i) and the corresponding macrosample words are multiplexed in (22) before being transmitted over a line or otherwise stored or processed as needed.

Figure 2:
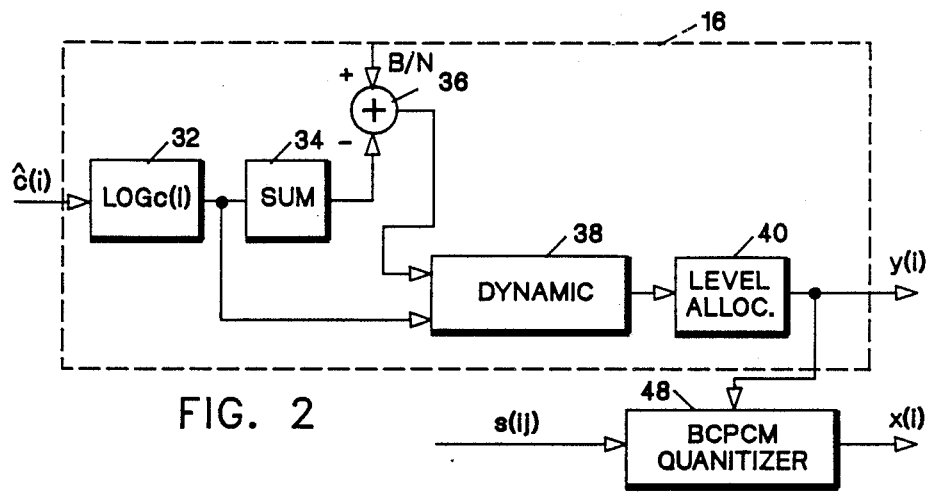
FIG. 2 is a detailed representation of one of the elements of FIG. 1.

Represented in FIG. 2 is an embodiment of the dynamic level allocating means (16). the base two logarithmic values of the (i) for $i=1,2,3,\ldots,N$, are computed in (32), and added together in a device (34). The device (34) output value is subtracted in (36) from the constant value B/N to get a constant block value "sigma".

$$\text{sigma} = \frac{B}{N} - \frac{1}{N} \sum_{j=1}^{N} \log c(j) \quad (4)$$

The constant block value sigma is used to dynamically allocate in (38) the requantizing levels q(i) throughout the subbands according to:

$$q(i) = 2 ** (\text{sigma} + \log c(i)) \quad (5)$$

In practice, the q(i) values should be made to be OPTIMAL integer values. The way of doing this would be by finding a set of integer requantizing levels y(i) which gives a minimal quantizing energy (i.e. noise) under the constraint that the total product of the allocated integer levels, at any sampling instant throughout the subband, should not exceed the total number K of available levels given by:

$$K = 2**B = \prod_{i=1}^{N} q(i) \quad (6)$$

Wherein PROD represents a product operation for $i=1,2,3,\ldots,N$. Therefore, $$\prod_{i=1}^{N} y(i) \leq K \quad (7)$$

The candidate set of integer allocations is formed by all the possible combinations of integer levels y(i) which are closest to q(i).

The candidate set of integer allocations contains 2**N possible allocations from which the optimal one should be selected. A process developed for dynamically selecting optimal quantizing levels will be described in the sequel. This process will be based on a recurrent method for minimizing a noise energy "e" factor while keeping the levels between dynamically set up limits.

Once the y(i) values have been determined for a block of samples, satisfying equation (7), then each subband sample is requantized within a corresponding requantizer (18) using levels $0, 1, \ldots, y(i)-1$. Hence, each subband sample S(i,j) is represented by an integer number x(i) in the quantizer range:

$$0 \leq x(i) \leq y(i) - 1 \qquad (8)$$

Once requantized, each macrosample is packed in (20) (see FIG. 1) into a single binary word W. Again, by macrosample one should understand the group of samples provided by the various subbands at the same sampling instant.

Packing of the N integers x(i), i=1,2,...,N, into one binary word W is done using a mixed radix packing method; thus the packed W word corresponding to the j-th macrosample (i.e the macrosample made of one sample from each of the N subbands at the j-th sampling time within the same block of samples)within the block being processed is:

$$W(j) = x(1) + x(2) \cdot Y(1) + \ldots + x(N-1) \cdot Y(N-2) + \qquad (9)$$

$$x(N) \cdot Y(N-1)$$

where $$Y(k) = \mathop{\mathrm{PROD}}_{j=1}^{k} y(j) \qquad (10)$$

or, in other words:

$$W(j) = \mathop{\mathrm{SUM}}_{i=1}^{N} \left( x(i) \cdot \left( \mathop{\mathrm{PROD}}_{k=1}^{i-1} y(k) \right) \right) \qquad (11)$$

The operations (11) are performed into the packing device 20.

Then each block of macro-samples is represented by a block of words W and N quantizing levels, or by a block of words W and N characteristic terms c'(i). The second alternative has been chosen here.

Figure 3:
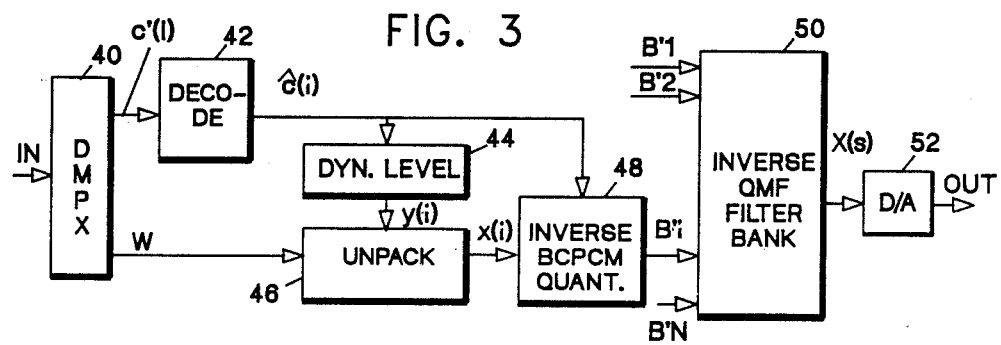
FIG. 3 is a block diagram of a decoder/receiver incorporating the invention.
Figure 4:
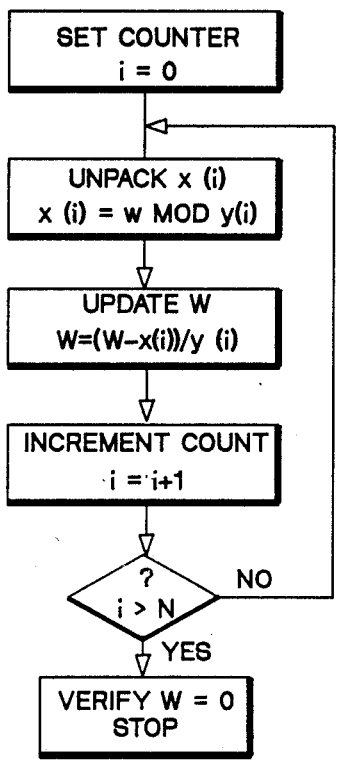
FIG. 4 is a flow chart illustrating the unpacking according to the invention.

Represented in FIG. 3, is the receiver or voice synthesizer matching with the coder (or voice analyser) of FIG. 1. The data received over the line is first demultiplexed in (40) to separate the c'(i) terms from the W terms. The characteristic terms are then decoded in (42) to recover the quantizing levels in (44). Unpacking operations are then performed in (46) to get the x(i) sample values, in accordance with the flow chart of FIG. 4. In other words:

W is first divided by y(1) to generate x(1)=W modulo y(1);

a new value of W=W1 is derived by subtracting x(1) from the original W value and dividing the result by y(1);

the W1 value is divided by y(2) to derive W(2)=W1 modulo y(2);

again W is updated to W2=(W1−x(2))/y(2);

The x(i) terms are submitted to an inverse BCPCM quantizer (48) regenerating the original samples S(i,j) over the corresponding subbands B'1 through B'N. Using an inverse QMF (Quadrature Mirror Filter) filter bank followed by a digital-to-analog device (52) helps then recovering the original voice signal. For details on the inverse quantizing and filtering operations, one may refer to the above referenced patents.

As already mentioned a Dynamic Programming method has been developed to efficiently sort the candidate set of 2**N possible integer allocations in order to determine the optimal integer allocation y(i) which gives the minimal quantizing energy while satisfying equation (7). This method may be described as follows:

INITIAL ALLOCATION STEP

1. Compute q(i) for i=1,2,...,N:

$$q(i) = 2^{**}(\text{sigma} + \log c(i))$$

with $\text{sigma} = B/N - (1/N) \mathop{\mathrm{SUM}}_{j=1}^{N} \log c(j)$

2. Discard bands with q(i)<1 and recompute remaining subbands with i being limited to the number of remaining subbands and N is updated accordingly.

3. Arrange the subbands in some ascending (increasing) priority order (i.e low to high energy and high to low frequency).

4. Compute candidate integer values of the levels for subbands. For example:

$$y1(i) = |q(i)| \text{ and } y2(i) = |q(i)| + 1 \qquad (12)$$

or $y1(i) = 2|0.5(q(i)+1)| - 1$ and $y2(i) = 2|0.5(q(i)+1)| + 1$ (Comment: there could be more than 2 candidate values. We choose only those which are close to q(i).)

A denotes rounding to the largest integer below A.

5. For each of the remaining bands, set :

alpha1 (i)=q(i)/y1 (i)

alpha2 (i)=q(i)/y2 (i)

6. Set initial values n=0 ; J(0)=<1>; e(0))=<0>

< > denotes a set of numbers. Therefore <1> is a set containing a single number of 1.

and compute

J min (0)=1/PROD alpha1 (i)

J max (0)=1/PROD alpha2 (i)

END OF INITIAL STEP

LEVEL ALLOCATION LOOP

7. Increment loop counter, to start a looped process:

n=n+1

8. Compute:

J min (n)=J min (n−1).alpha1 (n)

J max (n)=J max (n−1).alpha2 (n)

(Comment: alpha Sub 1, 2 were already computed in the initial step).

9. Evaluate:

e(n.J(n)) = minimum w.r.t alpha (n) of
(alpha(n)**2 + e(n − 1,J(n − 1))

for the set

<J(n)> = <alpha1, alpha2>* <J(n−1)>

(w.r.t. meaning with respect to)
<> denotes a set of numbers. Therefore <>*<> means the product of all possible combinations of numbers from the first set <alpha(n)> by numbers from the second set <J(n−1)>. The minimization is performed by computing the sum in step 9 for all candidate alpha(n) in the set, alpha1, alpha2 and all the previous values of e(n−1,J(n−1)) which correspond to the set of <J(n−1)>. For example, if we have 4 values in the set <(J(n−1)> then we have also 4 values of e(n−1,J n−1)) at each point of the set <J(n−1)>). Therefore, for the 2 candidate values of alpha(n) one have to compute 2*4 = 8 values of the product set <alpha(n)->*<J(n−1)> and the corresponding sum alpha (n)**2 + e(n−1,J(n−1)).

The minimization is performed such that at a given point J from the set <J(n)>, e(n,J) should be less then e(n,K) for any K which is greater then J. Hence, if a value J from <J(n)> does not satisfy this condition, it is discarded from the set. In addition, points which are outside the (J min (n), J max(n)) limit are discarded as well.
(Note : the limit depends upon n)

10. Associate with each remaining point in <J(n)> the corresponding value from the set alpha(n) = <alpha1 (n), alpha2 (n)> or the equivalent set y(n) = <y1 (n), y2 (n)>. check end of loop by comparing n to N and branch accordingly (meaning going either to step 11, should the test (n=N?) be positive, or back to step 7 otherwise).

END of LOOP

FINAL ALLOCATION STEP

11. Backtracking:
Step 0—
Select from the final set <J(N)> the optimal value J*(N)>1 which is the nearest to 1.
Step 1—
For J*(N), select its associated values, alpha * (N) from the set <alpha (N)> and y*(N) from the equivalent set <y(N)>.
Step 2—
Compute the origin J*(N−1) of J*(N) in the set <J(N−1)> by: J*(N−1) = J*(N)/alpha * (N)
Step 3—Repeat Steps 1-2 for N−1,N−2, . . . 1 .
The set y* = <y*(1), . . . ,y*(N)> contains the level allocation of the corresponding bands.

12. Rearrange the set according to the original sequence (before the reordering according to the priority).
NB : the symbol <> is used for conventional SET programming operation.

The process of determining the optimal integer allocation y(i) progresses recursively in N similar stages from i=1 to N. At a typical intermediate stage n of the process, the partial quantizing energy e(n,J(n)) of the first i=1,2, . . . n bands is minimized with respect to the possible integer values y(n) of the n-th band only, which are close to q(n) and may be selected using either equation (12) or (13). This energy function is computed only over a discrete set J(n) of points inside a specified interval (J min(n), J max(n)) which is updated from stage to stage. This is done in order to limit the search to those values which will eventually, at the last n=N stage, satisfy the condition of equation (7).

The process in initialized by computing the optimal non-integer allocation q(i) according to equations (1) through (5). Note that bands which have q(i) less than 1 are discarded and the allocation is recomputed without taking them into account. The bands are assigned in an ascending order of priority (e.g. low to high energy, high to low frequency bands). The initial partial energy function e(0,J(0)) is set initially to 0 and so is the counter of the process stage number, n. The initial interval (Jmin(0),Jmax(0)) is computed according step 6 of above described process.

At the end of the process the optimal integer allocation y(i) values are retrieved by backtracking the trajectory which led, at the N-th stage, to the minimal quantizing energy solution. Finally, the allocation is rearranged according to the original order.

I claim:
1. A process for coding a time-varying signal the spectrum of which extends over a given frequency band comprising the steps:
periodically sampling and digitizing the time-varying signal; dividing the digitized samples into fixed length blocks of contiguous samples;
filtering each said block of digitized samples to split at least a portion of the frequency band included in the said block into a number, N, of frequency subbands;
measuring the signal energy Ei, where i=1,2 . . . , N, contained within each of the N individual subbands within the blocks of digitized samples;
measuring the total signal energy within the blocks of digitized samples;
determining the number of quantizing levels q(i), where i=1,2, . . . ,N, to be dynamically assigned for quantizing each subband of a block of samples based on the signal energy E(i) of each subband verses the total signal energy in the block of samples; and
quantizing the each subband (i) using a number of quantizing levels equal to q(i).

2. A process according to claim 1 wherein each block of samples is coded using BCPCM techniques including deriving a characteristic term c(i) from each subband block and deriving the subband quantizing levels $$q(i) = 2^{**}\left( B/N + \log c(i) - 1/N \sum_{j=1}^{N} \log c(j) \right)$$

in which B is the total number of quantizing bits used, SUM indicates a summing operation, log is the base 2 logarithm, ** indicates a power operation and j is a computing integer parameter varying from 1 to N.

3. A process according to claim 2 wherein q(i) is adjusted to its nearest integer value y(i).

4. A process according to claim 3 characterized in that it further includes the following steps:
computing the product of the levels y(i) for the N subbands;
comparing the computed product of levels y(i) to a K value equal to 2**B, and then readjusting the y(i)

levels whenever the computed value is different from 2**B.

5. A process according to claim or 3 or 4, further characterized in that it includes optimizing the subband quantizing levels using the following operations:

a compute q(i) for i=1,2, . . . ,N:

$$q(i) = 2^{**}(\text{sigma} + \log c(i))$$

$$\text{with sigma} = B/N - (1/N) \underset{j=1}{\overset{N}{\text{SUM}}} \log c(j);$$

b discard bands with q(i)<1 and recompute q(i) for remaining subbands with i being limited to the number of remaining subbands and N is updated accordingly;

c arrange the subbands in some ascending (increasing) priority order (i.e low to high energy and high to low frequency);

d compute candidate integer values y1 (i) and y2 (i) of the levels q(i) for subbands ;

e for each of the remaining bands, set :
alpha1 (i)=q(i)/y1 (i)
alpha2 (i)=q(i)/y2 (i) ;

f set initial values
n=0 ; J(0)=<1>; e(0))=<0>; and compute
J min (0)=1/PROD alpha1 (i)
J max (0)=1/PROD alpha2 (i)
PROD indicating a product operation.

g start a recurrent process by increasing the initial value n so that n=n+1 ;

h compute:
J min (n)=J min (n−1) alpha1 (n)
J max (n)=J max (n−1) alpha2 (n)

i evaluate : e(n,j(n))=minimum with respect to alpha (n) of (alpha(n)**2+e(n−1,J(n−1) for the set <J(n)>=<alpha1, alpha2>* <J(n−1)>
the minimization is performed such that at a given point J from the set <J(n)>, e(n,J) should be less then e(n,K) for any K which is greater then J ; hence, if a value J from <J(n)> does not satisfy this condition, it is discarded from the set ; in addition, points which are outside the (J min (n), J max(n)) limit are discarded as well;

j associate with each remaining point in <J(n)> the corresponding value from the set alpha(n) = <alpha1 (n), alpha2 (n)> or the equivalent set y(n) = <y1 (n), y2 (n)>and repeat from step g until n=N (or for all remaining bands) and then proceed further to step k;

k backtracking :
step 0—
select from the final set <J(N)> the optimal value J*(N)>1 which is the nearest to 1 ;

step 1—
for J*(N), select its associated values, alpha * (N) from the set <alpha (N)> and y*(N) from the equivalent set <y(N)>;

step 2—
compute the origin J*(N−1) of J*(N) in the set <J(N−1)> by: J*(N−1)=J*(N)/alpha * (N)

step 3—Repeat Steps 1-2 for N−1,N−2 , . . . 1 ;

l rearrange the set according to the original sequence.

6. A process according to claim 1 in which:
(q(i) is determined by:

$$q(i) = 2^{**}\left( B/N + \log E(i)^{\frac{1}{2}} - (1/N) \underset{j=1}{\overset{N}{\text{SUM}}} \log E(j)^{\frac{1}{2}} \right)$$

wherein:
E(i) is the value of energy in the ith subband,
b is a predefined integer equal to the total number of quantizing bits available for quantizing,
N is the number of subbands,
SUM indicates a summing operation,
j is a computing integer parameter varying from 1 to N,
log is the base 2 logarithm, and
** indicates a power operation.

7. A process according to any one of claims 6 and 2 through 5 wherein the requantized subband samples at each sampling time are packed into one macrosample word W, with $$W = \underset{i=1}{\overset{N}{\text{SUM}}}\left( x(i)/ \underset{k=1}{\overset{i-1}{\text{PROD}}} y(k) \right)$$

x(i) being an integer value representing the sample on the i-th subband, N being the number of subbands, y(k) being the quantizing levels of the k-th subband, and k being a computing integer parameter varying from 1 to i−1.

8. A process according to claim 7 wherein said macrosample word: W=x(1)+x(2).Y(1)+. . . +x(N).Y(N−1) with x(i) being an integer value comprised between 0 and y(i)−1 and representing the requantized sample S(i,j) of the i-th subband at the j-th sampling instant, and Y(k) being equal to the product of levels y(j) for i=1,2, . . . ,k.

9. A voice decoder for decoding data including macrosamples w and corresponding characteristic terms c'(i) which have been multiplexed in accordance with the process set forth in claim 8, said voice decoder including:
demultiplexing means for separating each of said W words from its corresponding c'(i)$_s$;
dynamic level adjusting means sensitive to said c'(i) for deriving the corresponding Y(i) therefrom;
unpacking means connected to said dynamic level adjusting means and to said demultiplexing means for
deriving, the subband integer sample values x(i) therefrom;
inverse quantizing means connected to said unpacking means for deriving subband samples S(i,j);
an inverse filter bank connected to said inverse quantizing means for deriving voice coded signal samples X(s) therefrom; and,
digital-to-analog converting means, connected to said inverse filter bank.

10. A voice decoder according to claim 9, further characterized in that said unpacking means include:
means for setting i=1 and for deriving x(1)=W modulo y(1);
means for deriving a new word value W1=W−x(1);
means for setting i=2 and for deriving x(2)=W1 modulo y(2) ;
means for deriving W2=W−x2 ;

means for setting i=3, and for deriving x(3) =W2 modulo y(2); and, so an up to i=N, wherein N is the number of subbands.

11. A coder for coding a time sampled voice signal comprising:

filtering means (12) for splitting at least a portion of the voice signal bandwidth into N subbands, N being a predefined integer number; and BCPCM coding means, for coding each ith subband contents (i=1,2, . . . ,N) said BCPCM coding means including:

characteristics means sensitive to each ith subband contents for deriving the block BCPCM characteristic term C(i) therefrom;

BCPCM quantizing means connected to said filtering means; and, quantizer setting means, sensitive to the C(i) values for dynamically setting the quantizing levels q(i) for quantizing each subband signal, with:

$$q(i) = 2^{**}\left( B/N + \log c(i) - \mathop{\text{SUM}}_{j=1}^{N} \log c(j) \right)$$

wherein:

B is a predefined integer equal to the total number of quantizing bits available.

SUM stands for a mathematical summing operation, j is a computing integer parameter varying from 1 to N, and

** indicates a power operation.

12. A voice coder according to claim 11 characterized in that it includes packing means connected to said BCPCM quantizing means (18) and to said dynamic level setting means, for packing one sample from each subband considered at the same sampling time j, into a macrosample word W:

$$W(j) = \mathop{\text{SUM}}_{i=1}^{N}(x(i) \cdot (\text{PROD } y(k)))$$

13. A voice decoder according to claim 12 further including multiplexing means connected to said packing means for multiplexing said W macrosample with the corresponding characteristic terms.

* * * * *